United States Patent
Best et al.

(10) Patent No.: US 10,569,347 B2
(45) Date of Patent: Feb. 25, 2020

(54) DRILLING SYSTEM AND METHODS FOR DEEP HOLE DRILLING

(71) Applicant: Allied Machine & Engineering Corp, Dover, OH (US)

(72) Inventors: Paul W. Best, Mercer, PA (US); Salvatore D. Deluca, Cadiz, OH (US); Lucas S. Dummermuth, Sugarcreek, OH (US); David J. Carlisle, New Philadelphia, OH (US)

(73) Assignee: ALLIED MACHINE & ENGINEERING CORPORATION, Dover, OH (US)

( * ) Notice: Subject to any disclaimer, the term of this patent is extended or adjusted under 35 U.S.C. 154(b) by 198 days.

(21) Appl. No.: 15/270,817

(22) Filed: Sep. 20, 2016

(65) Prior Publication Data
US 2017/0080501 A1    Mar. 23, 2017

Related U.S. Application Data

(60) Provisional application No. 62/221,913, filed on Sep. 22, 2015.

(51) Int. Cl.
*B23B 51/02*        (2006.01)
*B23B 51/04*        (2006.01)
(Continued)

(52) U.S. Cl.
CPC ........ *B23B 51/0493* (2013.01); *B23B 51/009* (2013.01); *B23B 51/048* (2013.01);
(Continued)

(58) Field of Classification Search
CPC .......... B23B 2251/12; B23B 2251/122; B23B 2251/125; B23B 2251/48;
(Continued)

(56) References Cited

U.S. PATENT DOCUMENTS

| 6,095,725 | A | * | 8/2000 | Stahl | B23B 51/0493 408/1 R |
| 6,682,275 | B1 | * | 1/2004 | Lindblom | B23B 51/048 408/59 |

(Continued)

FOREIGN PATENT DOCUMENTS

| JP | 07068408 | A | * | 3/1995 |
| JP | 10109210 | A | * | 4/1998 |

(Continued)

OTHER PUBLICATIONS

European Patent Office, International Search Report/Written Opinion, dated Feb. 20, 2017, 21 pages, Europe.

*Primary Examiner* — Nicole N Ramos
(74) *Attorney, Agent, or Firm* — Hahn Loeser + Parks LLP; Scott M. Oldham, Esq.

(57) ABSTRACT

A deep hole drilling system and methods provide stability and cutting performance to produce deep holes having desired straightness. The system may include a replaceable cutting head provided with a center cutting member and first and second side cutting inserts. The tool provides a major diameter with the OD cutting margins on the replaceable side inserts, as well as possibly cutting margins on the center cutting member. Adjustment mechanisms are provided to adjust the center cutting member and/side cutting inserts.

20 Claims, 11 Drawing Sheets

(51) Int. Cl.
   *B23B 51/00* (2006.01)
   *E21B 10/633* (2006.01)
(52) U.S. Cl.
   CPC ............ *E21B 10/633* (2013.01); *B23B 51/02* (2013.01); *B23B 2250/12* (2013.01); *B23B 2251/422* (2013.01); *B23B 2251/505* (2013.01); *B23B 2251/54* (2013.01)
(58) Field of Classification Search
   CPC ... B23B 2251/422; B23B 41/02; B23B 47/00; Y10T 408/905; Y10T 408/906; Y10T 408/9065; Y10T 408/907; Y10T 408/909; Y10T 408/9093; Y10T 408/9095; Y10T 408/9097
   See application file for complete search history.

(56) References Cited

U.S. PATENT DOCUMENTS

| | | | | |
|---|---|---|---|---|
| 7,556,458 B2* | 7/2009 | Heilmann | ............... | B23B 29/03 407/11 |
| 7,572,088 B2* | 8/2009 | Biscay | ................ | B23Q 11/006 408/225 |
| 8,376,669 B2* | 2/2013 | Jaeger | .................... | B23B 31/11 408/226 |
| 8,517,644 B2* | 8/2013 | Meyer | ................... | B23B 51/048 408/224 |
| 8,696,269 B2* | 4/2014 | Danielsson | ......... | B23B 51/0486 408/200 |
| 2005/0100420 A1* | 5/2005 | Mast | ................... | B23B 51/0009 408/233 |
| 2009/0003948 A1 | 1/2009 | Lutz et al. | | |
| 2009/0044986 A1 | 2/2009 | Jaeger et al. | | |
| 2009/0297285 A1* | 12/2009 | Nomura | .................. | B23B 41/02 408/59 |
| 2010/0061817 A1* | 3/2010 | Nomura | ............. | B23B 51/0493 408/83 |
| 2013/0202376 A1* | 8/2013 | Meyer | .................... | B23B 51/02 408/203 |
| 2014/0255115 A1* | 9/2014 | Zabrosky | ............ | B23B 51/0493 408/59 |
| 2014/0356087 A1 | 12/2014 | Best et al. | | |

FOREIGN PATENT DOCUMENTS

| | | |
|---|---|---|
| WO | 2010093866 | 8/2010 |
| WO | 2014138184 | 9/2014 |

* cited by examiner

US 10,569,347 B2

DRILLING SYSTEM AND METHODS FOR DEEP HOLE DRILLING

CROSS REFERENCE TO RELATING APPLICATION

This non-provisional application claims priority to and the benefit of U. S. Provisional Patent Application Ser. No. 62/221,913, filed on Sep. 22, 2015, which is incorporated herein by reference in its entirety.

FIELD OF THE INVENTION

The present invention relates to the field of drilling, and in particular, to deep hole drilling systems, which produce holes with a large depth to diameter ratio in an accurate and effective manner.

BACKGROUND INFORMATION

Certain deep hole drilling systems such as gun drills, single tube drilling systems, and double tube drilling systems are known in the art. These deep hole drilling systems may be used for drilling holes with a large depth to diameter ratio.

Solid carbide tooling is disadvantageous due to the need to regrind the cutting edges when worn, requiring removal of the tool from the drilling machine. Other problems with deep hole drilling tools include instability during drilling and at breakout. Tools having replaceable cutting heads have also been developed, which may use indexable cutting inserts. For example, there have been developed a single tube drilling system, or STS, used to drill holes having large depth to diameter ratios with improved penetration rates, hole size accuracy, and straightness as compared to gun drills. At the same time, such systems have various disadvantages, due to a single effective cutting edge, which causes significant stresses during machining. Additionally, such systems generally utilize one or more wear pads, which due to the configuration, tends to bear on the sides of the formed hole during cutting with significant force, such that the wear pad tends to cause hardening of the hole and embrittlement of the material. The wear pads on the tool body are used in an attempt to provide stability to the front of the drill by making contact with the inside wall of the hole just previously drilled. The use of a wear pad on the opposing side of a major diameter cutting insert has to be set at a diameter under the insert. This causes the tool to drill under or over size due to the imbalance of cutting forces and the inability to precisely balance these forces. Problems with past designs also include issues such as chips remaining in the hole between the body diameter and the inside of the hole or inability to effectively evacuate chips during drilling.

For many applications, there is a need for tooling that can effectively produce holes with a large depth to diameter ratio, and with high accuracy and in a cost effective manner. It would therefore be desirable to have a tool that provides stability and keeps the drilling on center. It would also be desirable to provide tooling that allows simple and flexible set-ups and adjustment to allow the tool to more effectively drill large depth to diameter ratio holes with high accuracy in metal workpieces.

SUMMARY OF THE INVENTION

The invention is therefore directed to a drill system for deep hole applications comprising a generally cylindrical body member having an outer surface, and a duct formed from an opening in the outer surface and exiting through a rear of the body member. A replaceable cutting head is mountable to the front end of the body member. A central cutting member is provided in association with the cutting head, having first and second cutting edges extending from the rotational axis of the cutting head. Additionally, first and second side cutting inserts are mountable to the cutting head, each having a cutting edge extending from adjacent the central cutting member to cut the major diameter of a hole. In association with the side cutting inserts, an adjustment system is provided for adjusting the position of each of the side cutting inserts.

In another aspect of the invention, there is provided a drill system for deep hole applications comprising a generally cylindrical body member having an outer surface, and a duct formed from an opening in the outer surface and exiting through a rear of the body member and a replaceable cutting head mounted to the front end of the body member. A central cutting member and first and second side cutting inserts are provided in association with the cutting head. The body includes a relief area for channeling of drilling fluid to the cutting edges of the cutting members. Adjacent the opening in the outer surface of the body member, wear surfaces may be formed adjacent the opening to substantially seal the area around at least a part of the opening.

Other aspects of the invention will be apparent to those of skill in the art in view of the following written description and drawings relating to examples of the invention.

DETAILED DESCRIPTION

Figure 1:
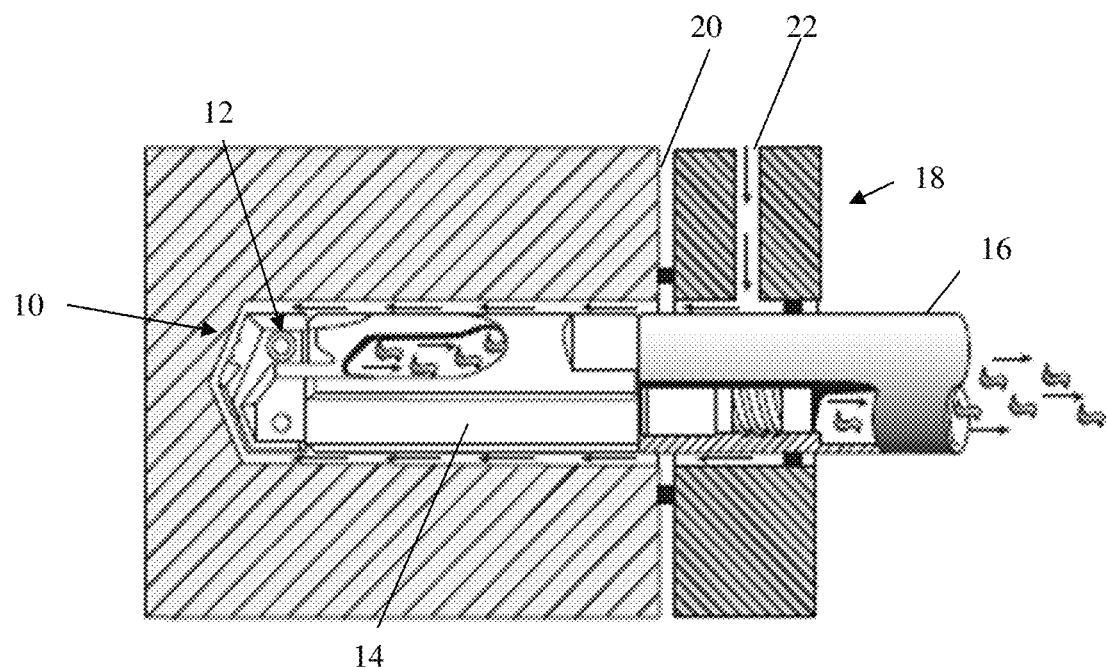
FIG. 1 shows a side view of an example of a drilling system in accordance with the present invention in use.
Figure 2:
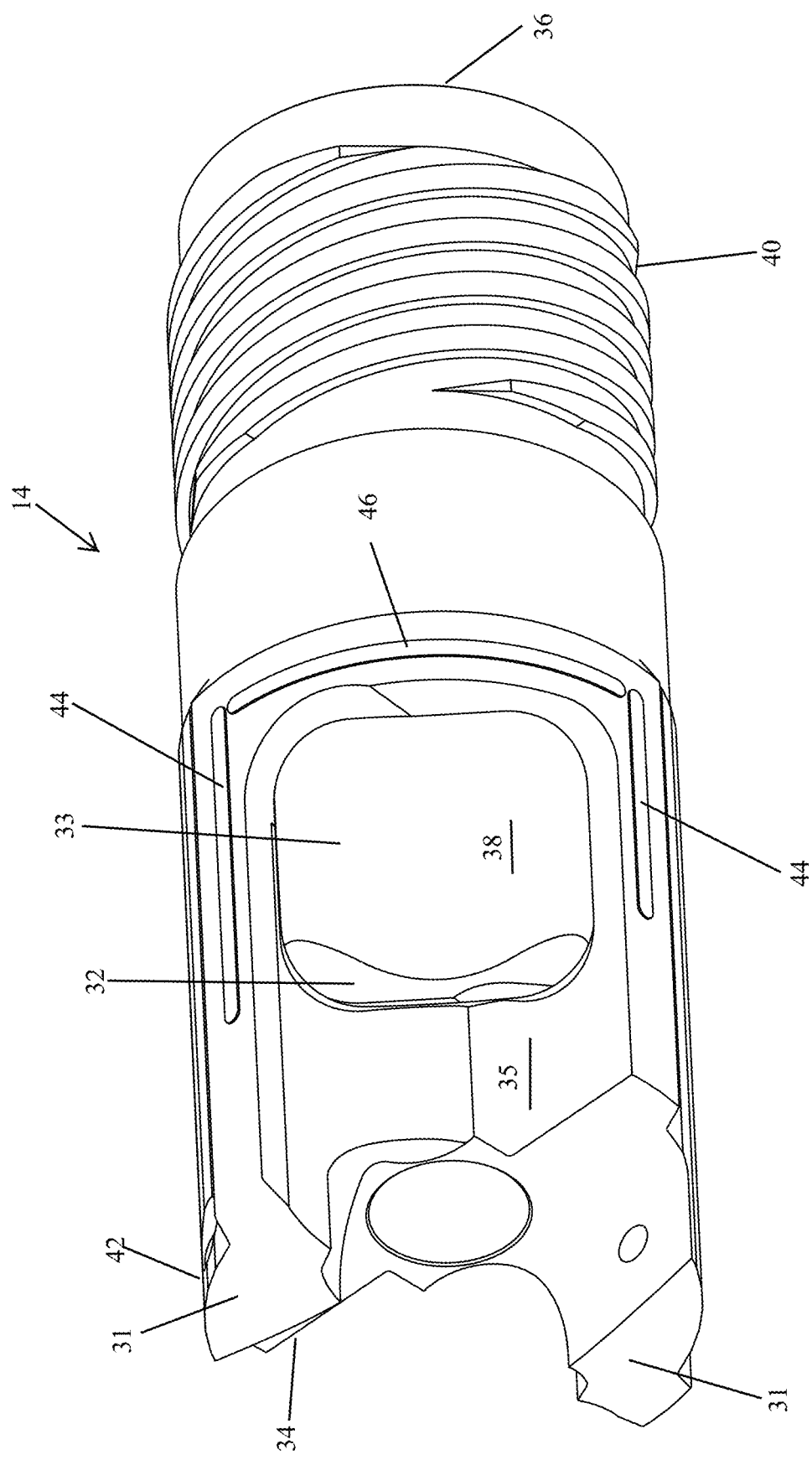
FIG. 2 shows a perspective view of a holder body in the example of FIG. 1.
Figure 3:
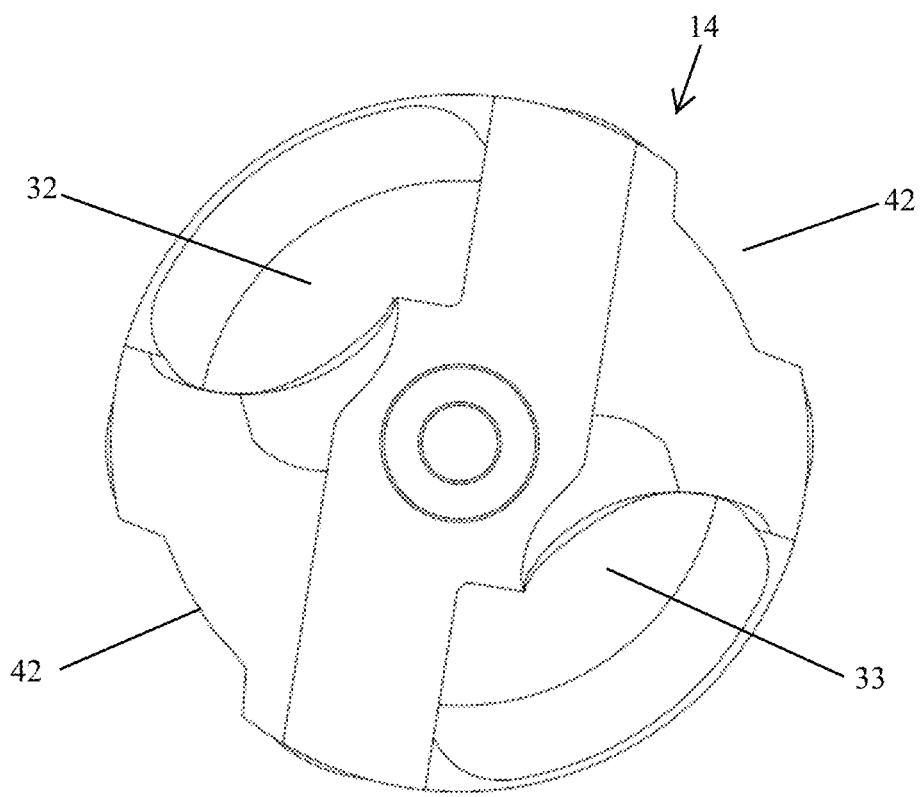
FIG. 3 shows a top view of a holder body in the example of FIG. 1.

Referring now to FIG. 1-9, examples of a drilling system according to the invention are set forth. An example of the drilling system is shown in context of use in a machining operation in FIG. 1. The drilling system 10 includes a drilling head 12 and an holder body 14, coupled to a tube 16. The STS drilling system of this example utilizes a sealed bushing 18 up against the face of a part 20, which induces coolant around the connected tube 16 by means of an inlet 22, and allows coolant to flow around the drilling head 12 and back through the coolant inlets in holder body 14, flushing metal chips produced during drilling down the inside of the tube 16. The STS drilling system requires a cutting fluid delivery system for providing a volume of cutting fluid at pressures of up to 1000 pounds per square inch (about 689.4 kilopascals) or more.

In this example, the holder body 14 may comprise a generally tubular shape having a first end, or shank end 36, and a second end 34. An evacuation channel, or duct 38 through at least a portion of the holder body 14 may exit the shank end 36 for passing chips and cutting fluid through the holder body 14 and into the tube 16 as referred to in FIG. 1. Inlet openings 32 and 33 are formed to allow drilling fluid to enter the duct 38. The shank end 36 is configured to attach to the tube 16, as shown in FIG. 1. The tube 16 may have an inside diameter and threads for attaching the drilling head. The holder body 14 may comprise threads 40 adjacent the first end 36, corresponding to the threads on the tube 16 and aligning the duct 38 with the tube 16 inside diameter. The duct 38 may or may not have to be the same diameter as the inside diameter of the tube 16 when the duct and tube are aligned. The threads 40 may be a multiple lead locking threads, a single lead thread or other suitable configuration. Though not shown in this example, a close tolerance fit tube bearing surface may be provided on the holder body 14 adjacent the intersection of the tube 16 and the holder body 14. The tube bearing surface may closely fit within an inside diameter of the tube 16 and an inside surface of the tube 16, to facilitate alignment of the holder body 14 with the tube 16.

The threads 40 alone or with a tube bearing surface may be designed to substantially seal the union between the tube and the holder body 14. Other sealing devices or methods may be utilized, such as for example but not limited to one or more o-rings, gaskets, sealing tapes, caulking materials, adhesives, or other sealing materials.

The tube 16 may be provided with threads on the inside surface corresponding to the threads 40 of the holder body 14. The inside tube threads may be locking threads that draw the threads 40 tighter into the tube as the drilling system is rotated in operation. Alternately, the holder body 14 may attach to the tube 16, by other attachments, such as for example but not limited to one or more keyways, clamps, flanges, screws, or other fasteners.

The holder body 14 is designed to allow flow of the maximum amount of coolant to the cutting inserts to be described hereafter, with as little loss of flow of drilling fluid around the inlets 32 and 33 as possible. To facilitate this in this example, this is provided by a large relieved area 42 on the body 14 that directs coolant to the cutting edges of the cutting inserts to be described hereafter. There may also be provided side wear pads 44 and also possibly a bottom wear pad 46, around the chip inlets 32 and 33, which serve as a multifunctional aid to the body 14. The tight tolerance and diameter allow for minimal coolant loss around the chip inlets 32 and 33, as the pads 44 and/or 46 effectively create a seal from engagement with the wall of the formed hole. The pads 44 and 46 may be deposition applied around the inlets 32 and 33 or may be brazed into position. A combination of brazing side pads 44 and deposition of bottom pad 46 may also be used. The pads 44 and/or 46 may be formed of a carbide material or ground carbide material such as titanium carbide, a tungsten carbide, aluminum bronze, high speed steel, hard chroming or other suitable wear material.

The pads 44 and/or 46 help coolant flow stay directed to the inserts, as well as preventing coolant from flowing toward the cutting edge from the front, preventing chips from flowing freely out of the tube. These pads 44 and/or 46 also serve as a bearing area for the drilling head 12 to support the tool in an interrupted cut situation, (i.e. drilling through a cross hole or an uneven breakout), as well as forcing the tool to run straight if the tool begins to lead off during the cut.

In this example, the evacuation cross holes 32 and 33 pass through both gullets 35 formed in approximately normal to the center axis of the holder body 14. Alternately, the holes 32 and 33 may pass through holder body 14 at an angle to the axis of the holder body 14. The duct 38 may extend through the holder body 14 between the shank end 36 and the holes 32 and 33. The chips that are evacuated from the cutting area may be flushed along the gullets 35, through the holes 32 and 33 and into the duct 38. The chips and cutting fluid from the drilled hole are flushed through the duct 38 and into the boring shank and tube 16. From there the cutting fluid and chips flow through the tube 16 and out of the machining center.

Figure 4:
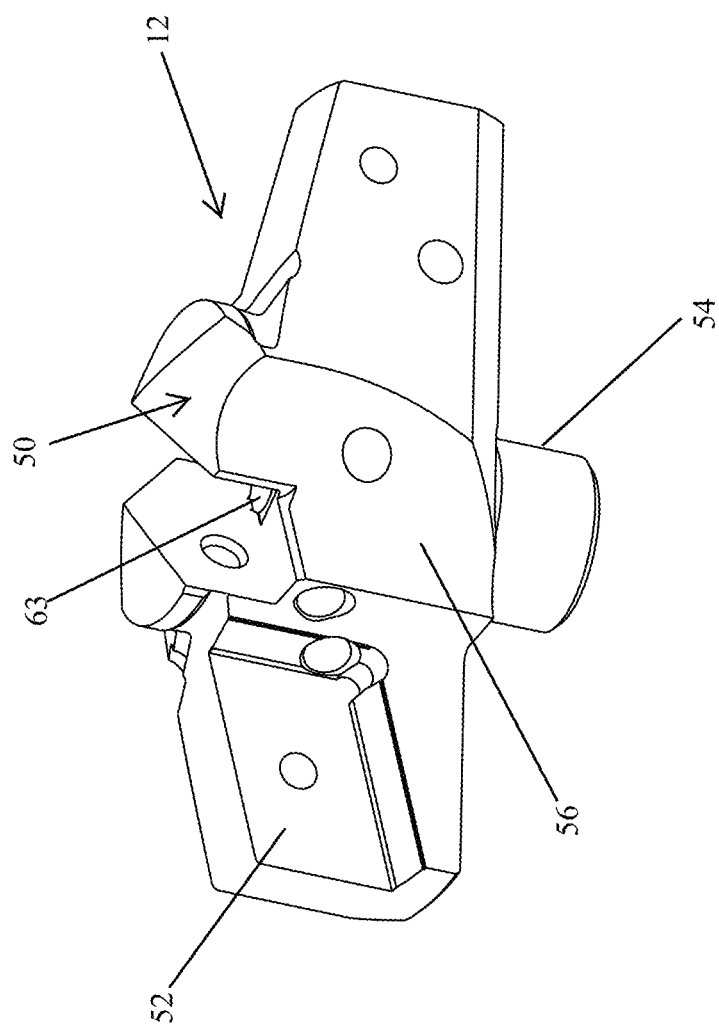
FIG. 4 shows a perspective view of the modular head in the example of FIG. 1.
Figure 5:
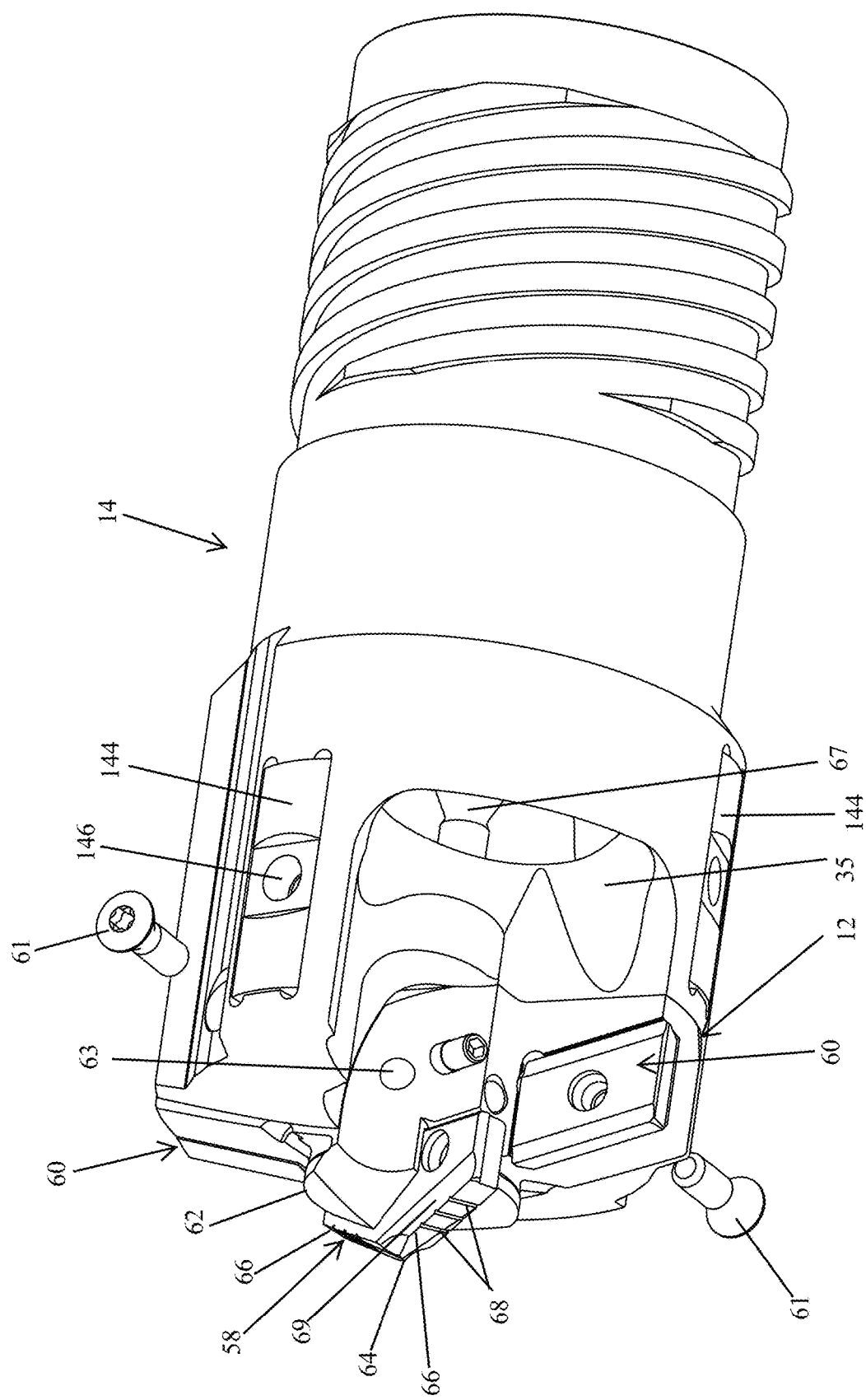
FIG. 5 shows a partial perspective view of the system in the example of FIG. 1.
Figure 6:
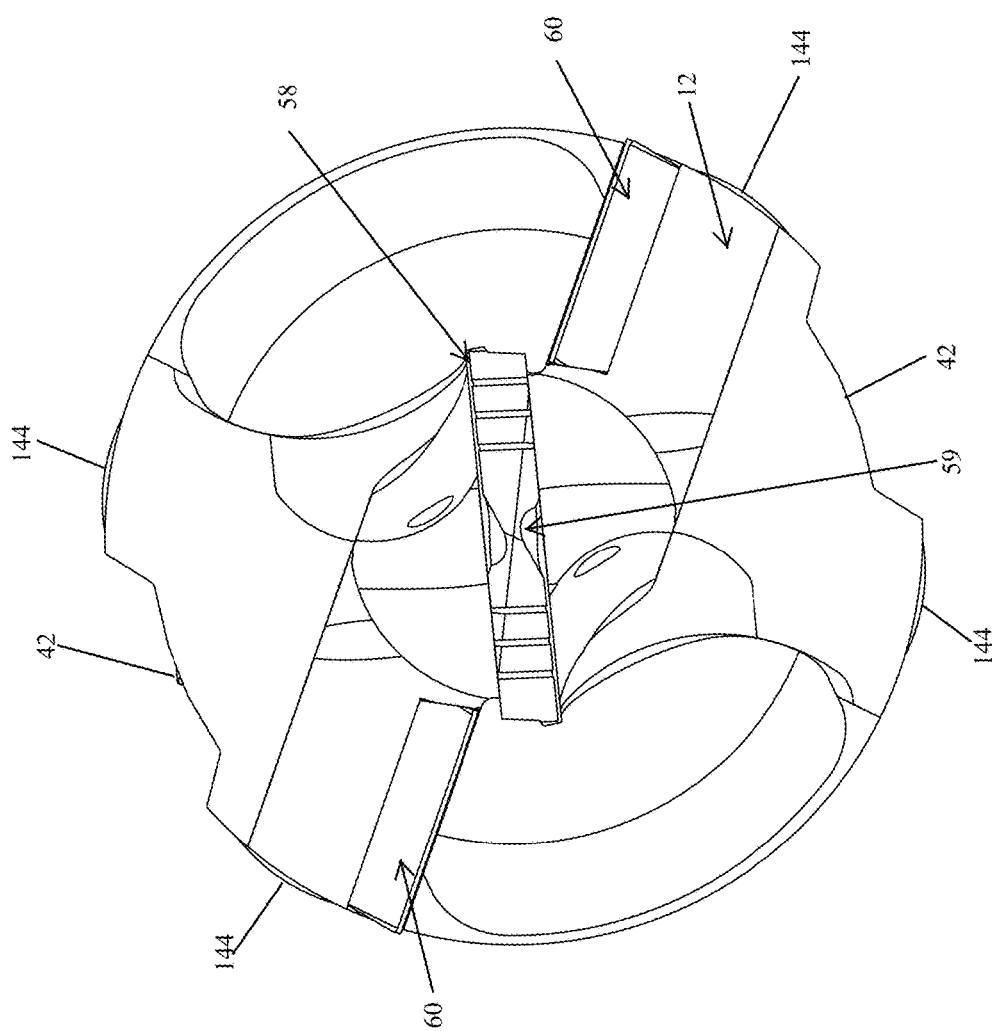
FIG. 6 shows a top view of a system in the example of FIG. 1.

Now referring to FIGS. 4-8, the drilling head 12 is shown in FIG. 4, and is designed to support a plurality of cutting inserts. The drilling head 12 of this example includes a central insert support 50 and side insert pockets 52. A central post 54 at the bottom is provided for fastening the modular drilling head 12 onto the body 14. Flute areas 56 are provided adjacent the central insert support 50 for evacuation of machined chips from the central cutting insert. As seen in FIG. 5, a central cutting insert 58 may be provided as a spade insert having an approximately flat polygonal shape having first and second faces and first and second side edges. The cutting insert may comprise one or more mounting apertures through the first and second faces, and fastened to ears 62 formed on the drilling head 12. The cutting insert 58 may further comprise a self-centering point 64, cutting edges 66 extending from the point 64 and optionally one or more chip breakers 68. The cutting edges 66 may be positioned at the leading edges as the insert 58 rotates. The cutting insert 58 may be an approximately symmetrical shape with the axis of rotation passing through the self-centering point 64. In a particular example, the insert 58 may further include a central cutting web 59 as seen in FIG. 6 with web cutting edges adjacent the point 64. The use of one or more web cutting edges in conjunction with cutting web 59 adjacent the point 64 may enable the material at the tip of the cutting insert 58 to shear and form a manageable chip. The web cutting edges may be radiused or notched with flat surfaces to facilitate use with different applications, or may be a v-notch configuration such as shown in U.S. Pat. No. 7,371,035, which is hereby incorporated by reference. The provision of a cutting web 59 may enable chip formation at the drill point and reduce extrusion due to the shearing ability of the cutting web. Further, the cutting web 59 may enable the drill cutting insert 58 to start the hole on-center and retain its straightness. Further, at least one cutting lip 69 may be positioned adjacent one or more cutting edges 66. The cutting lip 69 may include geometry capable of producing a curled metal chip for evacuating through the holder body 14. The size and shape of the chip may be controlled by altering the cutting lip 69 position, size and configuration. For example, a suitable insert 58 may be the T-A product produced by Allied Machine & Engineering Corporation, of Dover, Ohio. Alternatively, a different type of central cutting member may be used, such as one or more indexable inserts, twist drills or other suitable cutting members for machining of a metal workpiece.

One or more chip breakers 68 may be optionally provided on the cutting insert 58 to control the chip width. Controlling the chip width facilitates evacuation of chips through the center of the holder body 14. In some applications, chip breakers may not be required, for example with use in cutting cast iron or carbon fibers.

In this example, there may also be provided first and second side cutting inserts 60, for cutting the outside diameter of the hole. As seen in FIG. 5, the side inserts 60 are mounted in pockets 52 of drilling head 12. The side inserts 60 may be indexable to provide multiple cutting edges that can be successively used after wear of a cutting edge, or could be non-indexable cutting inserts. In this example, the center insert 58 is mounted to drilling head 12 via mounting screws that engage the mounting ears 62, and a mounting pin 63 extending through an aperture in the drilling head 12. The drilling head 12 is mounted to the body 14 and fastened by a screw 67 that draws the modular drilling head 12 onto the body 14. The modular drilling head 12 may be also be fastened by screws 61, that force the modular head against ears 31 formed on the body 14. The coupling of the inserts and modular head may be performed by other suitable fastening systems.

Figure 7:
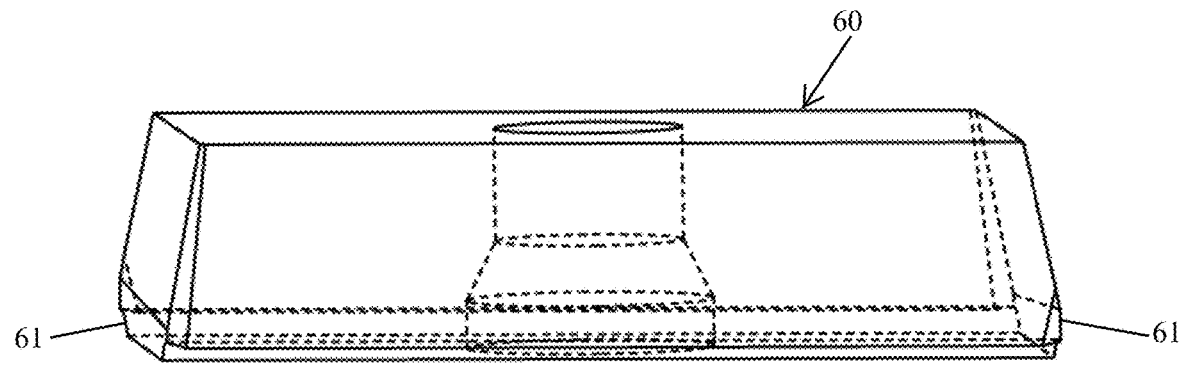
FIG. 7 shows a top view of a side cutting insert in the example of FIG. 1.

In association with this example, the inserts 58 and 60 are designed with cutting margins to facilitate precise machining. The insert design provides margined inserts 60 at the major drilling diameter to provide stability on entry, during the drilling cut cycle, and during the breakout on through hole applications, though use of the drilling system is not limited to through hole applications, and can also be used on blind hole applications. As seen in FIG. 7, the inserts 60 include cutting margins 61 on both edges. Unlike other known large hole drilling tools that use drill guide pads, the present invention avoids problems associated with such tools. In such known tools, the drill guide pads are set under the major drilling diameter for clearance to not avoid creating a seizure of the tool or marring of the drilling surface in the cut. The drilling tool of the invention instead gives direct diameter support utilizing an OD margin on the major diameter cutting inserts 60. In this example, the double margin inserts 60, with cutting margins 61 located at the major drilling diameter, are also rotated out from the center insert 58 margined OD plane, as shown by FIG. 6. The angle between the cutting plane of the side cutting inserts 60 and the cutting plane of the center cutting member 58 may be between 5°-60°. The rotation of the cutting plane of the side inserts 60 away from the cutting plane of the center cutting member 58 also breaks up the harmonics of the system, reducing drill vibration and tool chatter. This arrangement provides the drilling system with four points of margined support in a drilling application which increases the overall stability. This overall stability control will produce a truer hole and also aid in the surface finish in the cut with the four points of margin contact as the tool does not have the increased opportunity to move radially off the centerline of the hole during the drilling cycle. Alternatively, the cutting plane of the side inserts 60 do not have to be rotated relative to the cutting plane of the center insert 58. The ability to index the side inserts 60 to reveal a new cutting edge and provide the same margin support as noted above adds additional value to the inserts 60 due to the increased overall life that the inserts 60 will have. Further, in operation, when the cutting edges on inserts 58 and 60 have reached their expected life, the cutting inserts can be removed from the drilling head 12 and new cutting inserts easily installed and the drilling process continued.

As described with reference to the body 14, the large relieved area 42 on the body 14 directs coolant to the cutting edges of the cutting inserts 58 and 60. The clearance on the back side of the inserts 58 and 60 and head allows coolant to flow up and over the inserts, simultaneously forcing the chips into the inlets 32 and 33, and down the inside of the tube 16. The relieved area 42 may be approximately parallel to an axis through the holder body 14, and approximately parallel to an axis of rotation of the system 10. Alternately, the relieved area 42 may be directed in an angled orientation, spiral orientation, arcuate orientation, or any other orientation capable of directing the cutting fluid toward the inserts. The cutting fluid passing through the drilling system may act as a coolant for cooling the material being sheared in the cutting area to promote manageable chip formation. The cutting fluid also flushes the chips from the cutting area and evacuates the chips from the drilled hole. The relieved areas 42 enhance flow of fluid forward to quench the material being sheared in the cutting zone and provides coolant flow in the direction for the formed chips to travel from the cutting zone to the evacuation cross hole and channel described below, and through the coolant tube and out of the machining center.

Figure 8:
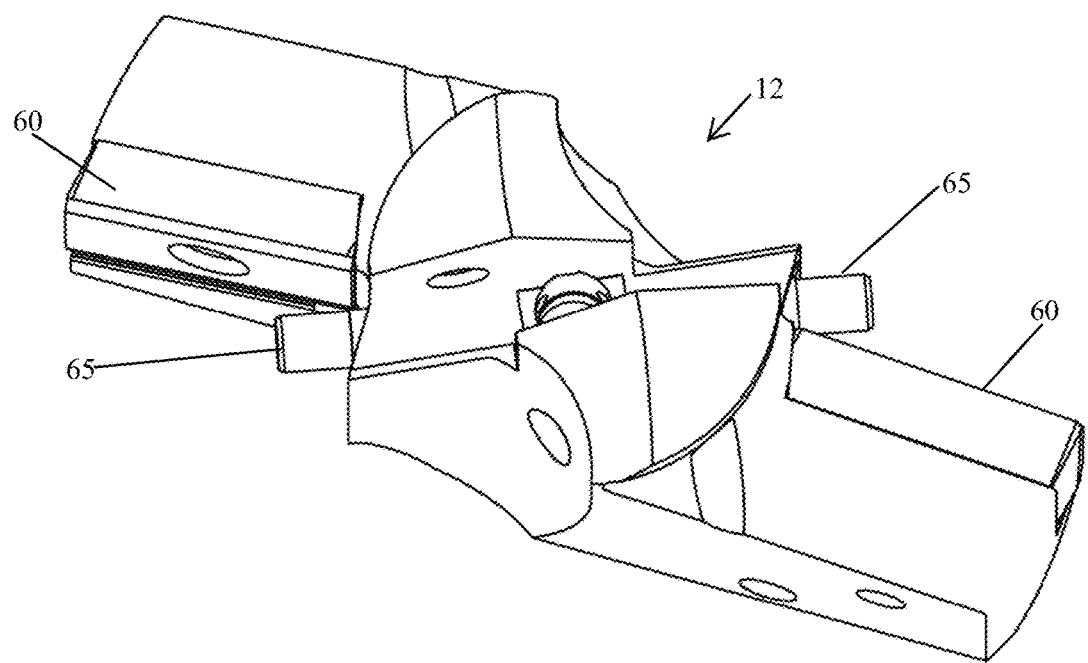
FIG. 8 shows a top view of a system in the example of FIG. 1, showing adjustment of the center insert.
Figure 9:
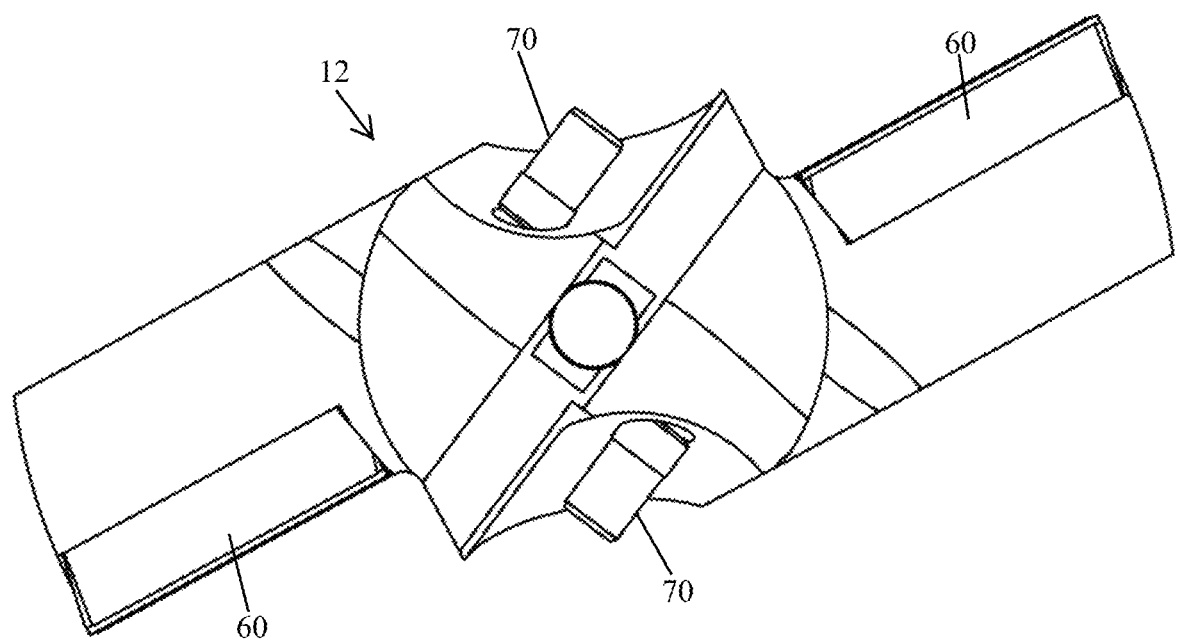
FIG. 9 shows a top view of a system in the example of FIG. 1, showing adjustment of the side inserts.

This example of the invention also provides additional unique attributes. The provision of a modular drilling head 12 allows the replacement of drilling head 12 in an easy manner in the case of damage. The system 10 of the invention allows a user to easily rebuild the tool in the event of minor tool failures. The replaceable drilling head 12 that serves as an insert holder allows rebuilding of the system without replacing costly holder bodies 14. Also, as seen in FIGS. 8 and 9, the This center insert 58 and/or two side inserts 60 may be adjusted. As seen in FIG. 8, adjustability of the center insert 58 may be provided by two set screws 65 positioned under the slot for positioning of the insert 58. The set screws 65 allow pushing the pin 63 on which the T-A locates radially in the same plane of the insert margins. This gives the user the ability to negate the buildup of manufacturing tolerances and ensure that the center insert 58 is running centrally by taking out the TIR. When center insert 58 is running in near-perfect on center condition, the cutting forces are more evenly balanced and the system drills straighter. This also helps keep the system on center through the entire drilling process as opposed to starting out with some TIR and not being able to correct this. When the tool starts the drilling process in an out of center condition it will have a greater probability to run-out, and over a long length of cut this increases exponentially. The adjustment of the center insert 58 may allow the user to compensate for the stack up of manufacturing tolerances in the connection to the components of the system, to facilitate proper precise drilling.

Similarly, with reference to FIG. 9, the position of the side inserts 60 can also be adjusted. The second portion of adjustability is designed for the major diameter cutting of the double effective cutting double margin inserts 60. Two additional set screws 70 may be provided with the drilling head 12, to provide the ability to push on the inside wall clearance angle of the inserts 60, thereby moving one or both of the inserts 60 axially to adjust the major diameter of each insert 60. This adjustability allows the user to overcome the buildup of manufacturing tolerances so that the major cutting diameter could be set to a near perfect condition for both inserts 60. Setting both of the inserts 60 as close as possible to the major cutting diameter desired ensures that the cutting forces will be well balanced, allowing for more even wear of the inserts 60, as well as a more precise drilled hole size.

The design being setup as a double effective cutting tool also allows for a significant increase in allowable penetration rate versus a single effective tool, however a single effective tool may be suitable for certain applications.

As an alternative, the drilling system may be embodied as a Double Tube System, or DTS drilling system, which is based on similar principles as the Single Tube System. Both systems may utilize a cylindrical body design and evacuate cutting fluid and chips internally. Due to the design of the DTS system, it may use less cutting fluid pressure and volume. In such an example, the DTS drilling system may include a drilling head, an outer tube, an inner tube, and a rotating or non-rotating machine connection. The drilling head 14 may be threaded onto the outer tube, with an inner tube in communication with one or more apertures through the drilling head holder body. Both the inner and outer tubes are retained by a machine tool connector. Cutting fluid is channeled through the machine tool connector and between the outer tube and the inner tube. A portion of the cutting fluid is directed internally into the inner tube through venturi slots in the inner tube wall. The remaining cutting fluid proceeds to the cutting edge in order to cool and lubricate the tool. The cutting fluid diverted through the venturi slots creates a low pressure area in the inner tube drawing cutting fluid and chips from the cutting edge through the drilling head and into the inner tube.

As described, the drilling system 10 may be used with Single Tube System or Double Tube Systems. The disclosed drilling system 10 also provides additional flexibility to meet objectives for different applications. For example, the substrate, coating, and geometry options may allow for the system 10 to function in applications where prior art drills fail. The substrate material of the cutting inserts 58 and/or 60 may be changed to accommodate different types of applications. Also, different coatings may be usable in association with the inserts 58 and/or 60. For example, a diamond film coating may be used on the cutting edges and clearance surfaces of inserts 58 and/or 60 to minimize flank wear growth. An example of these types of films include carbon vapor deposition (CVD) polycrystalline diamond film. Diamond film coatings may be helpful when cutting non-metallic abrasive materials for example. Other coating materials, such as titanium aluminum nitride or other suitable materials, may be used. The inserts 58 or 60 may be coated by known suitable methods, with a desired coating based upon a particular application for the system 10. The use of inserts 58 and 60 also allows the cutting geometry to be formed for various applications, with various modifications in cutting geometry possible to enhance the cutting performance for different applications or materials. For example, different cutting geometries may include, but are not limited to, the cutting lip 69 geometry having a positive rake angle, the cutting web having a positive rake angle, the insert 58 having a self-centering point, and/or providing a desired chip breaking configuration in association with the cutting edges. Positive cutting lip 69 geometry produces a tightly curled chip that is easy to evacuate through the tool, with the compact size of the chip resulting from the predetermined lip position, size and configuration. Many modifications can be made to the lip configuration to enhance the development of chip formation for example. The use of a positive cutting web geometry allows the material at the point of insert 14 to shear and form a more manageable chip, which can minimize the action of extruding material at the center of the drilled hole due to the low velocity differential at the center of the drill point. This also can provide the benefit of drilling a hole that starts on center and retains an improved overall straightness. A self-centering point geometry may be provided by a combination of clearance features on the point of the insert 58 that improve the centering capability. Improving the centering capability can improve the drilling stability and overall hole straightness. The addition of chip breakers can control the chip width, thereby assisting in creating a formable chip that can be evacuated through the center of the holder body 14.

A second advantage with the disclosed drilling system is a reduction in cost per hole. This may be realized in several different ways. When the tool is worn out or damaged, the modular design of the drilling head 12 in conjunction with a body 14 avoids the need to replace the head and/or body. This can be costly, especially as the hole diameter increases. With the presently disclosed invention, an operator may replace the worn or damaged cutting inserts 58 or 60 easily, without affecting set up of the system. The drilling system thus provides the ability to quickly and efficiently change the cutting edges when they become worn. The cost of the holder body 14 may be amortized over multiple cutting insert changes reducing the total tool cost.

The cost per hole can also be calculated based on an increased penetration rate. The presently disclosed drilling system includes two effective cutting edges from the center to the OD. This design can offer a significant performance advantage over a single effective cutting tool. With two effective cutting edges, the system may allow doubling of the feed rate of a comparable single cutting edge design. This increased penetration rate reduces the time in the cut freeing up machine time. The arrangement according to the examples of the present invention provides various advantages and overcomes problems associated with prior systems. For example, the arrangement does not result in work hardening of the material adjacent the hole, as no significant forces are imposed on the sides of the formed hole. The cutting geometry provided by the center insert 58 and side inserts 60 may comprise an included angle such that radial loads imposed by the system are minimized, and heat generation is also minimized, such that no embrittlement of the machined material occurs.

The large diameter system of the invention provides the advantage of running a double effective tool, capable of running at higher penetration rates, while having modular capability. This double effective design in conjunction with both of the major diameter cutting inserts having adjustability ensure that the margins of the tool run concentric and on size, allowing the system to drill straighter, provide a better surface finish, and increase the overall stability of the tool during the drilling process. The drilling system 10 in accordance with the present invention may include a variety of features and attributes to promote stability and chip removal, and maximize the precision of the drilling operation while increasing tool life.

Figure 10:
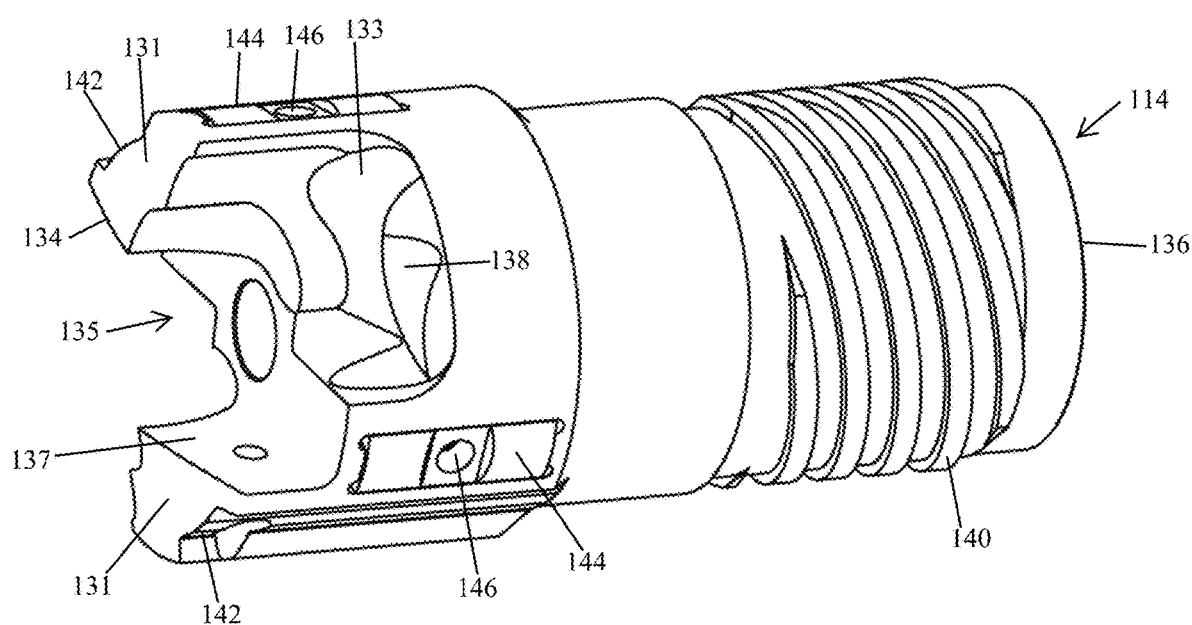
FIG. 10 shows a side view of an alternate embodiment of the holder body of the drilling system in accordance with the present invention.
Figure 11:
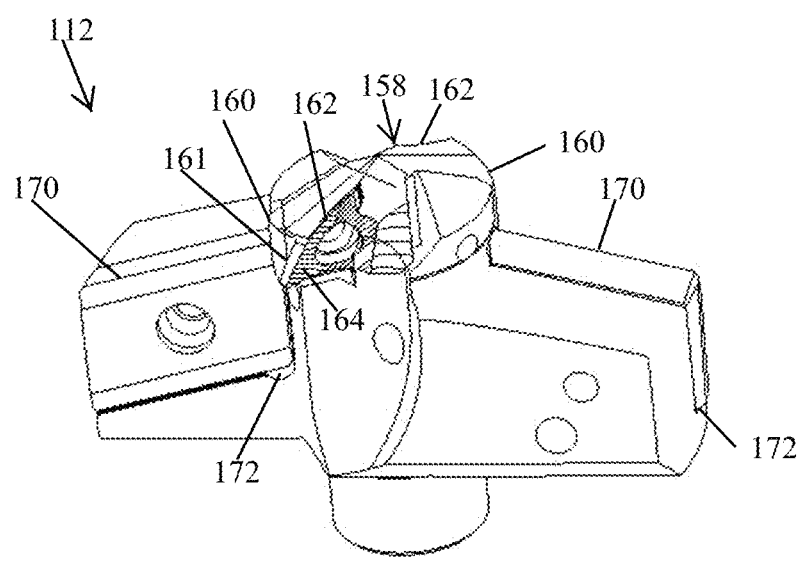
FIG. 11 shows a perspective view of an alternate embodiment of the cutting head of the drilling system in accordance with the present invention.
Figure 12:
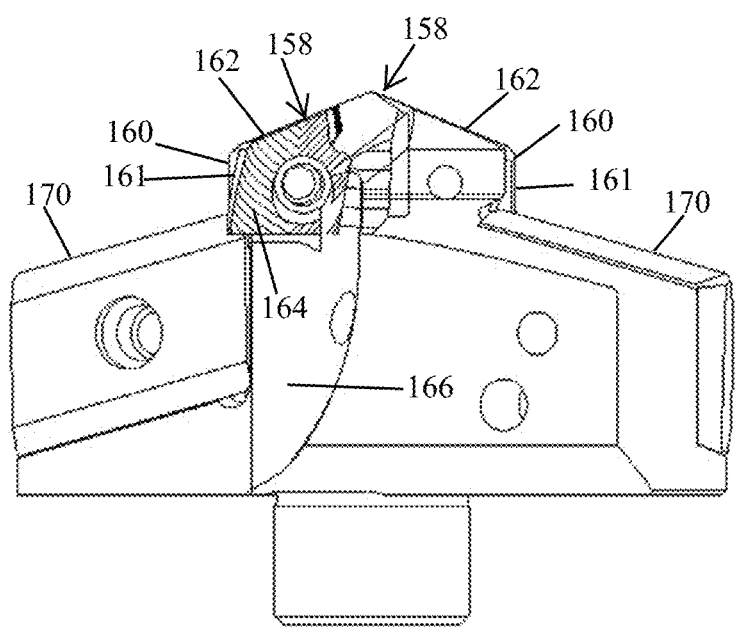
FIG. 12 shows a side view of the embodiment of the cutting head of the drilling system as shown in FIG. 11.

Turning to FIGS. 10-12, an alternate example of the tool is shown. As in the prior example, the holder body 114 may comprise a generally tubular shape having a first end, or shank end 136, and a second end 134. At the second end 134, there is provided a head mounting portion 135, configured to mount the cutting head 112 which includes a central cutting insert 158 which may be a modified spade type drill blade, with peripheral cylindrical side surfaces 160 of the insert being generally arcuate and having a center at the rotational axis of the head 112 once the insert 158 is positioned and secured with head 112. Central drill insert 158 has a cutting end opposite a second support end, and a first face side opposite a second face side. The support end may be a generally planar surface and the cutting end has at least two curved cutting edges 162. Each face side comprises an attachment surface and a helical flute 164. The attachment surfaces may be generally planar and parallel to each other, although not limited as such. The peripheral cylindrical side surfaces 160 may also include a helical margin 161 adjacent the helical flute 164. The insert 158 includes apertures for fastening to the head mounting portion 135, each aperture positioned through each helical flute 164 and extending through the drill insert body to the attachment surface of the opposite face side to allow attachment to support surface 137 of the holder 114. The helical flutes 164 may be formed at the same helix angle as that of flutes 166 of the cutting head 112 and positioned to form a continuous flute with flutes formed in the holder body 114 when the drill head 112 is assembled on the holder body 114. The flutes 164 are adjacent the cutting edges 162 results in efficient and quick removal of chips, even at high drilling speeds. The cutting edges 162 are formed by the interface of the cutting end and the helical flutes 164 of the insert 158 resulting in curved, helical cutting edges. If desired, the cutting edges may be provided with chip breakers to facilitate formation of desired. The cutting edges 162 may include a plurality of cutting components, including a self-centering point which cooperate together to provide the desired cutting geometry for the material and/or drilling application. For example, a suitable insert 158 may be the GEN3SYS product produced by Allied Machine & Engineering Corporation, of Dover, Ohio, or as described in U.S. Pat. No. 7,131,799 or 7,950,881, which are hereby incorporated by reference. Alternatively, a different type of central cutting member may be used, such as a one or more indexable inserts, twist drills or other suitable cutting members for machining of a metal workpiece. Also in this example, there may also be provided first and second side cutting inserts 170, for cutting the outside diameter of the hole. The side inserts 170 are mounted in pockets 172 of drilling head 112. The side inserts 170 may be indexable to provide multiple cutting edges that can be successively used after wear of a cutting edge, or could be non-indexable cutting inserts.

In the holder body 114, an evacuation channel, or duct 138 through at least a portion of the holder body 114 may exit the shank end 136 for passing chips and cutting fluid through the holder body 114 and into the tube as referred to in relation to the example of FIG. 1. An inlet openings 133 and an opposing opening (not shown) are formed about the central region to allow drilling fluid to enter the duct 138. The shank end 136 is configured to attach to a tube (not shown) as in the example of FIG. 1. The holder body 114 may comprise threads 140 adjacent the first end 136, to attach to the tube and aligning the duct 138 with the tube inside diameter. The duct 138 may or may not have to be the same diameter as the inside diameter of the tube when the duct and tube are aligned. The threads 140 may be a multiple start thread, multiple lead locking threads, a single lead thread or other suitable configuration. A close tolerance fit tube bearing surface may be provided on the holder body 114 adjacent the intersection with the tube. The tube bearing surface may closely fit within an inside diameter of the tube and an inside surface of the tube, to facilitate alignment of the holder body 114 with the tube. The threads 140 alone or with a tube bearing surface may be configured to substantially seal the union between the tube and the holder body 114. Other sealing devices or methods may be utilized, such as for example but not limited to one or more o-rings, gaskets, sealing tapes, caulking materials, adhesives, or other suitable sealing materials. As in the prior example, the attachment of the holder body 114 to a tube may use any suitable arrangement. Relieved areas 142 may again be provided on the body 114 to direct coolant to the cutting edges of the cutting inserts. In this example and also the example shown in FIGS. 5 and 6, there may also be provided side wear pads 144 disposed in pockets around the sides of the relieved areas 142 (or 42 in FIGS. 5 and 6). The wear pads 144 may be fastened in the pockets and to the body 114 using a suitable retaining member such as a countersunk head screw 146. Other fastening systems may require no retaining member for locking the pad 144 onto the body 114, such as brazing, using a dovetail type connection using undercut side walls to allow clamping in a self-locking manner, or adhesively bonded therein. The tight tolerance and diameter of pads 144 allow for minimal coolant loss and effectively create a seal from engagement with the wall of the formed hole. The pads 144 may be formed of a carbide material or ground carbide material such as titanium carbide, a tungsten carbide, aluminum bronze, high speed steel, hard chroming or other suitable wear material. The pads 144 help coolant flow stay directed to the inserts, as well as preventing coolant from flowing toward the cutting edge from the front, preventing chips from flowing freely out of the tube. These pads 144 also serve as a bearing area for the body 114 to support the tool in an interrupted cut situation, (i.e. drilling through a cross hole or an uneven breakout), as well as forcing the tool to run straight if the tool begins to lead off during the cut.

It should be recognized that the drilling system of the invention is not limited to the exemplary drill system as shown. The configuration described herein and the particulars thereof can be readily applied to a variety of systems and applications. It is therefore understood that the above-described embodiments are illustrative of specific embodiments which can represent applications of the invention. Numerous and varied other arrangements can be made by those skilled in the art without departing from the spirit and scope of the invention.

What is claimed is:

1. A drilling system comprising a generally cylindrical body member having an outer surface and a front and rear end, the body member having a duct formed on the interior of the body member and extending from a pair of openings in the outer surface adjacent the front end and to the rear of the body member, the duct sized to receive and flush metal chips produced during drilling down the duct and out the rear of the body member; a replaceable cutting head mounted to the front end of the body member having a central cutting member with first and second cutting edges extending from the rotational axis of the cutting head, and first and second side cutting inserts, each side cutting insert being indexable and having first and second cutting edges, with one of the first and second cutting edges exposed for cutting and extending from adjacent the central insert to the major diameter of a hole, wherein each of the side cutting inserts have first and second cutting margins extending between each of the two cutting edges such that one of the first and second cutting margins is exposed at the major diameter of the hole the entire dimension of the side cutting insert.

2. The drilling system of claim 1, wherein there is an area around the openings on the outer surface of the body member that includes wear surfaces to substantially seal the area around at least a part of each opening.

3. The drilling system of claim 2, further comprising a wear surface formed adjacent the bottom of the openings in the outer surface of the body member.

4. The drilling system of claim 2, wherein the wear surfaces are formed from a group consisting of inserts attached the body member, deposition applied wear material or combinations thereof.

5. The drilling system of claim 1, wherein the body member includes a relief area extending from the front to the rear for channeling of drilling fluid to the cutting head.

6. The drilling system of claim 1, where the side cutting inserts are mounted in pockets in the body member with an outer edge and the cutting margin extends beyond the edge of the pocket along its entire length.

7. The drilling system of claim 1, further comprising a side insert adjustment mechanism comprising first and second screws positioned to push on the inside wall clearance angle of a cutting margin on the first and second side cutting inserts, to independently adjust the major diameter of each of the first and second side inserts.

8. The drilling system of claim 1, where the central cutting member and the side cutting inserts each have a cutting plane, and the cutting plane of the side cutting inserts is rotationally offset from the cutting plane of the center cutting member.

9. The drilling system of claim 1, where the angle between the cutting plane of the side cutting inserts and the cutting plane of the insert center cutting member is between 5°-60°.

10. The drilling system of claim 1, where the center cutting member has a front side and a rear side and cutting margins extending from the front side to the rear side such that there are four lines of margined cutting support when the center cutting member and side cutting inserts are engaged in a hole during drilling.

11. The drilling system of claim 1, where the center cutting member includes outer edges having a cutting margin at the edges.

12. The drilling system of claim 1, further comprising an adjustment mechanism associated with the center cutting member to adjust the center cutting member radially.

13. The drilling system of claim 1, further comprising an adjustment mechanism associated with each of the side cutting inserts to axially adjust each of the two side cutting inserts independently.

14. The drilling system of claim 1, further comprising an adjustment mechanism associated with the center cutting member to adjust it radially, and an adjustment mechanism associated with each of the side cutting inserts to adjust each of the two side cutting inserts.

15. The drilling system of claim 1, further comprising first and second drill guide pads set under the major drilling diameter adjacent the first and second side cutting inserts and third and fourth guide pads positioned at about ninety degrees from the first and second guide pads.

16. A drilling system comprising a generally cylindrical body member having an outer surface and a front end, and a duct formed from a pair of openings in the outer surface and exiting through a rear of the body member, a replaceable cutting head mounted to the front end of the body member having a central cutting member with first and second cutting edges extending from the rotational axis of the cutting head, and first and second side cutting inserts, each having a cutting edge extending from adjacent the central insert to, and wherein the body member includes a pair of relieved areas extending along the exterior of the body member from the front end to the rear of the body member for channeling of drilling fluid to the cutting head, and an adjustment mechanism associated with each side cutting insert and the center cutting member to adjust each of the side cutting inserts and center cutting member.

17. The drilling system of claim 16 further comprising wear surfaces formed adjacent the at least the sides of the openings in the outer surface of the body member to substantially seal the area around at least a part of the opening.

18. The drilling system of claim 16, further comprising first and second cutting margins on the center cutting member lying in parallel planes to one another and an adjustment mechanism associated with the center cutting member to adjust the center cutting member radially.

19. The drilling system of claim 18, wherein the adjustment mechanism associated with each of the side cutting inserts is used to adjust the two side cutting inserts axially.

20. The drilling system of claim 18, wherein the adjustment mechanism associated with the center cutting member is used to adjust the position of the center cutting member radially in the same plane as the margins thereof.

* * * * *